United States Patent
Fukunaga et al.

[11] Patent Number: 6,025,899
[45] Date of Patent: Feb. 15, 2000

[54] LIQUID CRYSTAL DISPLAY, COLOR FILTER SUBSTRATE, AND METHOD OF MANUFACTURING COLOR FILTER SUBSTRATE

[75] Inventors: Yoko Fukunaga; Yasushi Kawata, both of Yokohama; Kazuki Taira, Kawasaki; Norihiko Kamiura, Yokohama, all of Japan

[73] Assignee: Kabushiki Kaisha Toshiba, Kawasaki, Japan

[21] Appl. No.: 09/120,111

[22] Filed: Jul. 22, 1998

[30] Foreign Application Priority Data

Jul. 28, 1997 [JP] Japan .................................. 9-201517

[51] Int. Cl.[7] .................................................. G09F 9/00
[52] U.S. Cl. ............................... 349/115; 349/106; 430/7
[58] Field of Search .................................. 349/106, 110, 349/176, 115, 97, FOR 115; 430/7; 359/891

[56] References Cited

U.S. PATENT DOCUMENTS

| | | | |
|---|---|---|---|
| 5,221,982 | 6/1993 | Faris ........................................ | 349/176 |
| 5,251,071 | 10/1993 | Kusukawa et al. ...................... | 349/106 |
| 5,508,134 | 4/1996 | Shirai ...................................... | 349/106 |
| 5,712,694 | 1/1998 | Taira et al. .................................... | 349/9 |
| 5,815,232 | 9/1998 | Miyazaki et al. ........................ | 349/106 |
| 5,822,029 | 10/1998 | Davis et al. .............................. | 349/115 |

FOREIGN PATENT DOCUMENTS 6-130424  5/1994  Japan .
8-320480  12/1996  Japan .

*Primary Examiner*—William L. Sikes
*Assistant Examiner*—Walter Malinowski
*Attorney, Agent, or Firm*—Finnegan, Henderson, Farabow, Garrett & Dunner, L.L.P.

[57] ABSTRACT

A liquid crystal display includes a first substrate having a transparent electrode formed on its surface and a non-aperture portion in its predetermined region, a second substrate separated from and opposed to the first substrate, a member having a color filter function and a transparent electrode formed on the second substrate, a liquid crystal layer sandwiched a between the first and second substrates, and a backlight optical system arranged on the side of the second substrate away from the first substrate. The member having a color filter function is patterned in accordance with the display unit controlled by the two transparent electrodes. This member is a color reflecting layer stack constituted by a stack of a first planar-oriented cholesteric liquid crystal layer having a first chiral pitch and a second planar-oriented cholesteric liquid crystal layer having a second chiral pitch different from the first chiral pitch. This color reflecting layer stack has a three-layered stacked region formed by further stacking a third planar-oriented cholesteric liquid crystal layer having a third chiral pitch different from the first and second chiral pitches. The three-layered stacked region corresponds to the non-aperture portion of the first substrate and has a function of returning light from the non-aperture portion to the backlight optical system.

12 Claims, 10 Drawing Sheets

LIQUID CRYSTAL DISPLAY, COLOR FILTER SUBSTRATE, AND METHOD OF MANUFACTURING COLOR FILTER SUBSTRATE

BACKGROUND OF THE INVENTION

The present invention relates to a liquid crystal display and, more particularly, to a low-consumption-power color liquid crystal display which is obtained by decreasing the size, weight, consumption power, and cost of a projection-type color liquid crystal display and suitably applicable to, e.g., a color liquid crystal viewfinder or a head mounted display used in a video camera or a digital still camera.

Recently, the image quality and resolution of liquid crystal displays are increasingly improving, and such liquid crystal displays are replacing cathode-ray tubes as medium- and small-sized displays such as personal computer displays.

As large-sized displays using a color liquid crystal display, projection-type liquid crystal displays (liquid crystal projectors) are marketed. This projection display has the advantage that a TFT liquid crystal display which is difficult to increase in size can be made small. In currently prevalent liquid crystal projectors, white light from a light source is divided into three primary colors of light, images of these three primary colors are formed by three pixels corresponding to these colors, and a color image is formed by using an optical system which focuses these images on one screen. Conventional three-panel projectors of this type are heavy and expensive because the optical system occupies a large space. To solve this problem, single-panel projectors are also being studied in which color filter patterns which transmit only three primary colors of light respectively, and absorb their complementary colors are formed in one liquid crystal cell.

Unfortunately, such single-panel projectors require a light source at least three times as bright as a light source of the conventional three-panel projectors, and this increases the consumption power. Also, light absorbed by the color filters causes color deterioration of the color filters and lowers the reliability. For these reasons, single-panel projectors have not been marketed yet.

Examples of small-sized displays using a color liquid crystal display are viewfinders used in video cameras or digital still cameras, and head mounted displays. Video cameras and digital still cameras except those for professional uses are supposed to be carried. Therefore, it is being desired to reduce the consumption power to meet the demand of battery capacity. Also, head mounted displays are preferably cordless when the ease with which these displays are mounted is taken into consideration. Therefore, low consumption power is being desired.

Liquid crystal projectors, liquid crystal viewfinders, and head mounted displays have the following common problem. That is, high resolution particularly decreases the pixel pitch when color filters are incorporated into liquid crystal cells. This decreases the aperture ratio and results in low light utilization. Low light utilization leads to an increase in the consumption power of a light source.

In consideration of the above situation, it is being demanded to establish a technology capable of reducing the consumption power of a high-resolution, full-color liquid crystal display.

Meanwhile, with advancing mobile communication technologies, development of liquid crystal displays as portable terminals is being sought. To use a liquid crystal display as a portable terminal, its consumption power must be reduced in respect of battery capacity. Therefore, a general conventional approach is to use monochromatic or multi-color reflection-type liquid crystal displays as portable terminals. However, with the spread of the Internet and the like, even a portable terminal is required to include a function of displaying high-quality, full-color image information. For the reasons as above, the image quality of the conventional reflection liquid crystal displays cannot satisfy the users. Accordingly, transmission-type color liquid crystal displays requiring a backlight are currently used even at the expense of battery capacity.

In a transmission-type liquid crystal display using a TN (Twisted Nematic) liquid crystal which is currently used most frequently, a backlight as a light source accounts for approximately 60% of the consumption power of the display. This is because most light from the backlight is absorbed by a polarizing plate and color filters, so the backlight is required to have a light amount including the loss of light absorbed by the polarizing plate and the color filters in order to ensure enough brightness. In a transmission-type liquid crystal display requiring a polarizing plate on the light incident side, the utilization of light from a backlight is limited to 50% in principle due to absorption by the polarizing plate. Additionally, to display color images, the light must pass through R, G, and B color filters. This further decreases the light utilization to ⅓. That is, together with the loss at the polarizing plate, the light utilization is limited to 16.7% in principle.

Recently, it is being attempted to reduce the light loss by absorption at a polarizing plate by using a backlight incorporating a polarization converting optical system (e.g., Jpn. Pat. Appln. KOKAI Publication Nos. 7-36032 and 7-36025). However, the problem of the light loss by absorption at color filters still remains unsolved in these attempts.

From the foregoing, it is being demanded to realize a full-color liquid crystal display which keeps the image quality of the conventional transmission-type liquid crystal displays and at the same time consumes little power.

As described above, a high-image-quality, low-consumption-power color liquid crystal display is being desired and has not been accomplished yet.

BRIEF SUMMARY OF THE INVENTION

It is, therefore, an object of the present invention to provide a low-consumption-power, high-resolution color liquid crystal display requiring a backlight by largely reducing the consumption power by reducing light loss at color filters and a black matrix.

According to one aspect of the present invention, there is provided a liquid crystal display comprising a first substrate having a transparent electrode formed on a surface and a non-aperture portion in a predetermined region, a second substrate arranged to be separated from and opposed to the first substrate, a member having a color filter function and a transparent electrode being formed on the second substrate, a liquid crystal layer sandwiched between the first and second substrates, and a backlight optical system arranged on a side of the second substrate away from the first substrate, wherein the member formed on the second substrate and having a color filter function is patterned in accordance with a display unit controlled by the two transparent electrodes and is a color reflecting layer stack constituted by a stack of a first planar-oriented cholesteric liquid crystal layer having a first chiral pitch and a second planar-oriented cholesteric liquid crystal layer having a second chiral pitch different from the first chiral pitch, and the color reflecting layer stack has a three-layered stacked region formed by further stacking a third planar-oriented cholesteric liquid crystal layer having a third chiral pitch different from the first and second chiral pitches, the three-layered stacked region corresponding to the non-aperture portion of the first substrate and having a function of returning light from the non-aperture portion to the backlight optical system.

According to another aspect of the present invention, there is provided a color filter substrate comprising a substrate and a patterned member formed on the substrate and having a color filter function, wherein the member having a color filter function is a color reflecting layer stack constituted by a stack formed by stacking a first planar-oriented cholesteric liquid crystal layer having a first chiral pitch and a second planar-oriented cholesteric liquid crystal layer having a second chiral pitch different from the first chiral pitch, and the color reflecting layer stack has a three-layered stacked region formed by further stacking a third planar-oriented cholesteric liquid crystal layer having a third chiral pitch different from the first and second chiral pitches.

According to still another aspect of the present invention, there is provided a method of manufacturing a color filter substrate comprising the steps of forming a first resist film by coating a substrate with a first cholesteric liquid crystal resist having a first cholesteric pitch, forming a second resist film by coating the first resist film with a second cholesteric liquid crystal resist having the first cholesteric pitch and a chirality opposite to a chirality of the first cholesteric resist, forming a first resist pattern having the first cholesteric pitch by irradiating ultraviolet radiation on a predetermined region of the first and second resist films and developing the first and second resist films, and baking the first resist pattern, forming a third resist film by coating the substrate, on which the first resist pattern is formed, with a third cholesteric liquid crystal resist having a second cholesteric pitch, forming a fourth resist film by coating the third resist film with a fourth cholesteric liquid crystal resist having the second cholesteric pitch and a chirality opposite to a chirality of the third cholesteric resist, forming a second resist pattern having the second cholesteric pitch by irradiating ultraviolet radiation on a predetermined region of the third and fourth resist films and developing the third and fourth resist films, and baking the second resist pattern, forming a fifth resist film by coating the substrate, on which the second resist pattern is formed, with a fifth cholesteric liquid crystal resist having a third cholesteric pitch, forming a sixth resist film by coating the fifth resist film with a sixth cholesteric liquid crystal resist having the third cholesteric pitch and a chirality opposite to a chirality of the fifth cholesteric resist, and forming a third resist pattern having the third cholesteric pitch by irradiating ultraviolet radiation on a predetermined region of the fifth and sixth resist films and developing the fifth and sixth resist films, and baking the third resist pattern, wherein the first, second, and third cholesteric pitches are different from each other.

According to still another aspect of the present invention, there is provided a method of manufacturing a color filter substrate comprising the steps of forming a first resist film by coating a substrate with a first cholesteric liquid crystal resist having a first cholesteric pitch, forming a first resist pattern having the first cholesteric pitch by irradiating ultraviolet radiation on a predetermined region of the first resist film and developing the first resist film, and baking the first resist pattern, forming a second resist film by coating the substrate, on which the first resist pattern is formed, with a second cholesteric liquid crystal resist having a second cholesteric pitch, forming a second resist pattern having the second cholesteric pitch by irradiating ultraviolet radiation on a predetermined region of the second resist film and developing the second resist film, and baking the second resist pattern, forming a third resist film by coating the substrate, on which the second resist pattern is formed, with a third cholesteric liquid crystal resist having a third cholesteric pitch, and forming a third resist pattern having the third cholesteric pitch by irradiating ultraviolet radiation on a predetermined region of the third resist film and developing the third resist film, and baking the third resist pattern, wherein the first, second, and third cholesteric pitches are different from each other.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
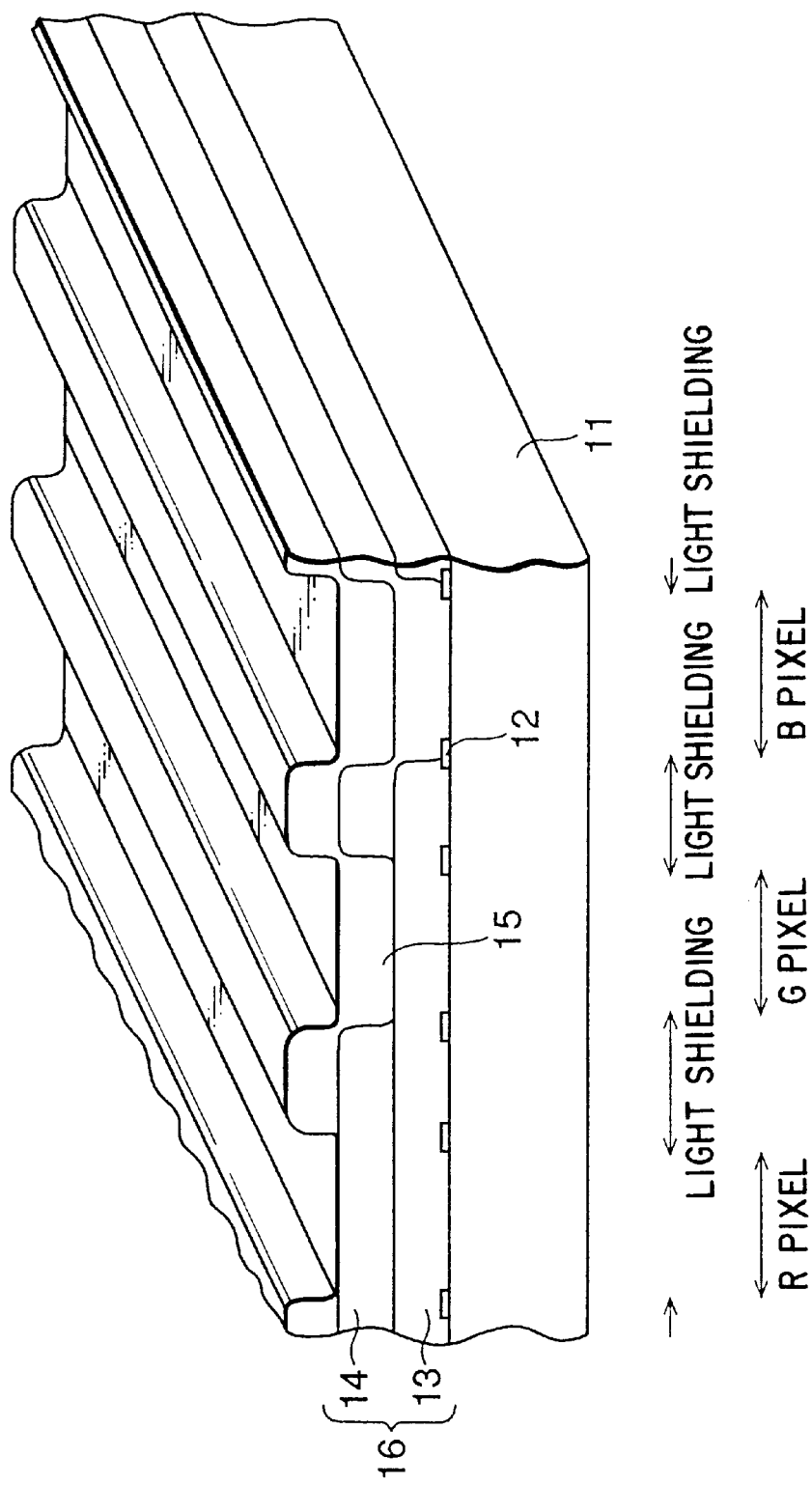
FIG. 1 is a schematic view showing the stacked structure of a color filter in a liquid crystal display of the present invention.

FIG. 1 schematically shows the stacked structure of a member having a color filter function in a liquid crystal display of the present invention. In this member with a color filter function shown in FIG. 1, a B reflecting layer 13, a G reflecting layer 14, and an R reflecting layer 15 are patterned respectively, and stacked on a substrate 11. The stack of these B, G, and R reflecting layers 13, 14, and 15 constitutes a member (color reflecting layer stack) 16 having a color filter function. A black matrix (BM) 12 is formed to suppress a leak of light due to color filter misalignment.

Note that a conventional color filter is formed by absorption single-layered color patterns which transmit red (R), green (G), and blue (B) and absorb their complementary colors.

In the present invention, the color reflecting layers for reflecting R, G, and B as three primary colors of light are stacked to subtract and each one of these three primary colors is eliminated one by one, thereby forming R, G, and B patterns. A color reflected by this color reflecting layer stack is reflected by a reflecting plate of a backlight optical system to become incident on another pixel and is reused. In this way this structure eliminates a light loss caused by color filters in principle. As the color reflecting layer stack, a selective reflecting wavelength plate including cholesteric liquid crystal layers can be used. By making the chiral pitches of the layers different from each other, the R, G, and B wavelength regions can be selected.

Figure 2:
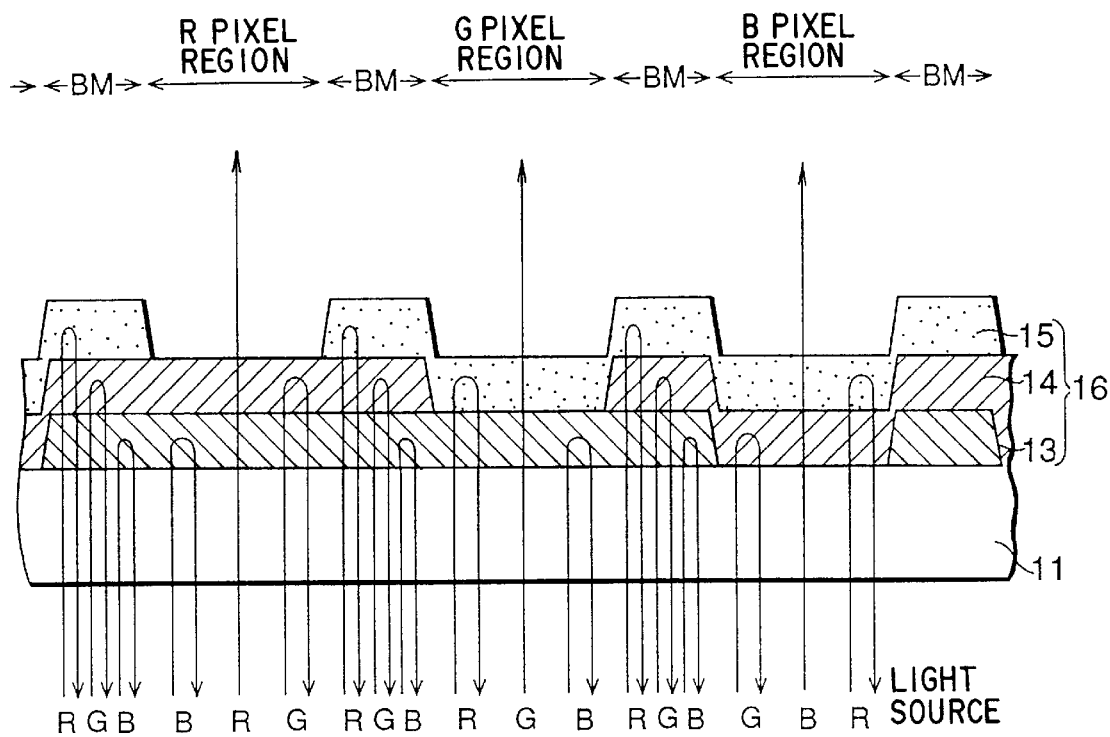
FIG. 2 is a schematic view showing the principle of improving the light utilization of the color filter in the liquid crystal display of the present invention.

FIG. 2 schematically shows the principle of improving the light utilization of a color filter in the liquid crystal display of the present invention. As shown in FIG. 2, in a region wherein the G and B reflecting layers 14 and 13 are stacked, the color reflecting plate selectively reflects G and B and transmits only R. Therefore, this region corresponds to an R pixel region. In a region wherein the B and R reflecting layers 13 and 15 are stacked, the color reflecting plate selectively reflects B and R and transmits only G. This region corresponds to a G pixel region. In a region wherein the R and G reflecting layers 15 and 14 are stacked, the color reflecting plate selectively reflects R and G and transmits only B. This region corresponds to a B pixel region.

In a region wherein all of the B, G, and R reflecting layers 13, 14, and 15 are stacked, all of B, G, and R are reflected. Hence, this region corresponds to a black matrix.

Each light thus reflected by the color reflecting plate is returned to a backlight as a light source. This light can be again directed to the color reflecting plate by arranging a reflecting member behind the light source.

The liquid crystal display of the present invention is preferably applicable to a liquid crystal projector. That is, the backlight optical system described above is constituted by a reflecting member and a light source interposed between the reflecting member and the second substrate. The reflecting member is a reflecting mirror so formed as to surround the light source. A lens is inserted between the light source and the second substrate. This liquid crystal display further comprises a projection screen.

In conventional single-panel projectors, color filter dyes absorb colors, and this deteriorates the image quality. However, the liquid crystal display of the present invention uses non-absorption color filters. Therefore, this conventional problem can be solved by applying the liquid crystal display of the present invention to projectors.

The liquid crystal display of the present invention can also be applied to a liquid crystal viewfinder or a head mounted display. That is, in this liquid crystal display, the backlight optical system has a light guiding-plate. The light source faces the end face of this light-guiding plate. A transparent diffusing plate is placed between the light source and the second substrate. A lens is arranged on the side of the first substrate. A portion from a liquid crystal cell, including the first and second substrates and a liquid crystal layer sandwiched between them, to the lens is surrounded by a light-shielding cylinder.

By using this light-shielding cylinder, the reflection of external light by a reflecting plate can be avoided.

In the color reflecting layer stack formed on the second substrate of the liquid crystal display of the present invention, a region corresponding to a non-aperture portion of the first substrate is a three-layered stacked region in which a third planar-oriented cholesteric liquid crystal layer is further stacked. This third cholesteric layer has a third chiral pitch different from the first and second chiral pitches.

In high-resolution color liquid crystal displays, a decrease in the utilization of light from a backlight resulting from a decrease in the aperture ratio is particularly a problem.

However, this problem can be avoided by the above arrangement. More specifically, in this liquid crystal display, portions corresponding to interconnections and the like of opposed switching element substrates are formed by stacking three or more layers for reflecting R, G, and B. Since this three-layered stacked region in which layers for reflecting R. G, and B are stacked is formed, all light components (R, G, and B) in the visible light region are reflected in this three-layered stacked region. Each color thus reflected is reused by reflecting the color by the reflecting plate of the backlight optical system and again inputting the reflected color to another pixel. Accordingly, the structure can eliminate a light loss in the light-shielding portion in principle.

Each of the cholesteric liquid crystal layers constituting the color reflecting layer stack in the liquid crystal display of the present invention can be formed by stacking a first planar-oriented cholesteric liquid crystal sublayer having a first chirality and a second planar-oriented cholesteric liquid crystal sublayer having a second chirality opposite to the first chirality. That is, the cholesteric liquid crystal layer can be a pair of cholesteric liquid crystal sublayers.

The present inventors have noted the fact that a selective reflecting layer using a cholesteric liquid crystal layer reflects circularly polarized light corresponding to the chirality of the layer, and obtained the color reflecting layer stack as described above. That is, this color reflecting layer stack is formed by pairing two cholesteric liquid crystal sublayers having the same chiral pitch and right-handed and left-handed chirality and stacking two or more such liquid crystal sublayer pairs. Consequently, it is possible to reflect both of right-handed and left-handed circularly polarized light. In other words, the color reflecting layer stack can selectively reflect all wavelengths corresponding to the chiral pitch regardless of the polarized state of light. This method can be applied to all systems regardless of a liquid crystal display mode.

In the liquid crystal display of the present invention, if the display method of the liquid crystal cell comprised of the first and second substrates and the liquid crystal layer sandwiched between them is a method having selectivity to circularly polarized light, the following arrangement is usable. That is, the planar-oriented cholesteric liquid crystal layers in the color reflecting layer stack have the same sign of chirality. Additionally, a white reflecting layer is formed between the color reflecting layer stack and the light source. This white reflecting layer is a cholesteric liquid crystal layer having a chirality different from that of the color reflecting layer stack.

A liquid crystal display having the above arrangement uses a liquid crystal display method which controls the circularly polarized light selection wavelength and transmission by voltage application by using a cholesteric liquid crystal as an ON/OFF control liquid crystal. A white reflecting layer is interposed between the color reflecting layer stack and the light source. This white reflecting layer consists of a cholesteric liquid crystal having a chirality opposite to that of the ON/OFF control liquid crystal. Incident light to the liquid crystal cell is limited to white circularly polarized light in a specific direction by this white reflecting layer. Furthermore, a color filter pattern is formed by a cholesteric selective reflecting layer stack having a chirality opposite to that of the white reflecting layer (i.e., having the same chirality as the ON/OFF control cholesteric liquid crystal). With this arrangement, color display can be performed by changing incoming light to the ON/OFF control cholesteric liquid crystal layer into circularly polarized light components R, G, and B in a specific direction.

The circularly polarized light reflected by the white reflecting layer is reflected by the reflecting plate of the backlight optical system. Consequently, the phase is shifted by $\pi$, and the direction of this circularly polarized light is reversed. Thereafter, this circularly polarized light enters the cell and is reused. The light reflected by the cholesteric selective reflecting layer stack makes two round trips between this selective reflecting layer stack and the reflecting plate. Consequently, the original direction of this circularly polarized light is restored. This light enters the cell and is reused.

The liquid crystal display method in the liquid crystal cell of the liquid crystal display of the present invention can also be a method which requires that incident light be polarized in a fixed direction. If this is the case, the following arrangement can be used. That is, the planar-oriented cholesteric liquid crystal layers in the color reflecting layer stack have the same sign of chirality. Also, a phase difference layer made from a liquid crystal polymer is formed between the color reflecting layer stack and the liquid crystal layer. Furthermore, a white reflecting layer is sandwiched between the color reflecting layer stack and the light source. This white reflecting layer is a cholesteric liquid crystal layer having a chirality different from that of the cholesteric liquid crystal layers constituting the color reflecting layer stack. The phase difference of the phase difference layer is set to $+\pi/4$ or $-\pi/4$ in the wavelength region of colors transmitted by the color filter.

A liquid crystal display having the above arrangement uses a liquid crystal display method which requires that input light be polarized in a fixed direction. The selectivity of a cholesteric liquid crystal selective reflecting plate to right-handed or left-handed circularly polarized light is converted into selectivity to linearly polarized light in a desired direction by insertion of a $\lambda/4$ plate between the reflecting layer stack and the liquid crystal layer.

A substrate (to be referred to as a color filter substrate hereinafter) including a member with a color filter function used in the liquid crystal display of the present invention can have the following arrangement. That is, this color filter substrate includes a substrate, a member having a color filter function, and an electrode for driving a liquid crystal. The member having a color filter function is formed on the substrate and patterned in accordance with a display unit. This member is a color reflecting layer stack that is a stack of a first planar-oriented cholesteric liquid crystal layer having a first chiral pitch and a second planar-oriented cholesteric liquid crystal layer having a second chiral pitch different from the first chiral pitch.

The color reflecting layer stack has a three-layered stacked region formed by further stacking a third planar-oriented cholesteric liquid crystal layer having a third chiral pitch different from the first and second chiral pitches.

The color filter substrate having the above arrangement is also applicable to a display using an optical shutter which uses an inorganic PLZT thin film, as well as to a liquid crystal display. If this is the case, it is effective to use a PLZT shutter array using a thin film transistor as a substrate.

In the color filter substrate with the above arrangement, a region corresponding to a non-aperture portion of the TFT substrate is constructed by a color reflecting layer stack which is a stack including three or more planar-oriented cholesteric liquid crystal layers having different chiral pitches. With this structure, it is possible to avoid the problem of a decrease in the utilization of light from the backlight resulting from a decrease in the aperture ratio.

Each of the cholesteric liquid crystal layers constituting the color reflecting layer stack described above can be formed by stacking a first planar-oriented cholesteric liquid crystal sublayer having a first chirality and a second planar-oriented cholesteric liquid crystal sublayer having a second chirality opposite to the first chirality. That is, the cholesteric liquid crystal layer can be a pair of cholesteric liquid crystal sublayers. If this is the case, color patterns which transmit R, G, and B can be obtained regardless of the polarized state of incident light.

The color filter substrate with the above arrangement can be manufactured by a method comprising the steps of forming a first resist film by coating a substrate with a first cholesteric liquid crystal resist having a first cholesteric pitch, forming a second resist film by coating the first resist film with a second cholesteric liquid crystal resist having the first cholesteric pitch and a chirality opposite to a chirality of the first cholesteric resist, forming a first resist pattern having the first cholesteric pitch by irradiating ultraviolet radiation on a predetermined region of the first and second resist films and developing the first and second resist films, and baking the first resist pattern, forming a third resist film by coating the substrate, on which the first resist pattern is formed, with a third cholesteric liquid crystal resist having a second cholesteric pitch, forming a fourth resist film by coating the third resist film with a fourth cholesteric liquid crystal resist having the second cholesteric pitch and a chirality opposite to a chirality of the third cholesteric resist, forming a second resist pattern having the second cholesteric pitch by irradiating ultraviolet radiation on a predetermined region of the third and fourth resist films and developing the third and fourth resist films, and baking the second resist pattern, forming a fifth resist film by coating the substrate, on which the second resist pattern is formed, with a fifth cholesteric liquid crystal resist having a third cholesteric pitch, forming a sixth resist film by coating the fifth resist film with a sixth cholesteric liquid crystal resist having the third cholesteric pitch and a chirality opposite to a chirality of the fifth cholesteric resist, and forming a third resist pattern having the third cholesteric pitch by irradiating ultraviolet radiation on a predetermined region of the fifth and sixth resist films and developing the fifth and sixth resist films, and baking the third resist pattern, wherein the first, second, and third cholesteric pitches are different from each other.

In the color reflecting layer stack in the color filter substrate of the present invention, the planar-oriented cholesteric liquid crystal layers can have the same sign of chirality. If this is the case, a white reflecting layer made from a cholesteric liquid crystal layer having a chirality different from that of the color reflecting layer stack can also be formed.

This color filter substrate can be manufactured by a method comprising the steps of forming a first resist film by coating a substrate with a first cholesteric liquid crystal resist having a first cholesteric pitch, forming a first resist pattern having the first cholesteric pitch by irradiating ultraviolet radiation on a predetermined region of the first resist film and developing the first resist film, and baking the first resist pattern, forming a second resist film by coating the substrate, on which the first resist pattern is formed, with a second cholesteric liquid crystal resist having a second cholesteric pitch and the same chirality as the first cholesteric liquid crystal resist, forming a second resist pattern having the second cholesteric pitch by irradiating ultraviolet radiation on a predetermined region of the second resist film and developing the second resist film, and baking the second resist pattern, forming a third resist film by coating the substrate, on which the second resist pattern is formed, with a third cholesteric liquid crystal resist having a third cholesteric pitch and the same chirality as the second cholesteric liquid crystal resist, and forming a third resist pattern having the third cholesteric pitch by irradiating ultraviolet radiation on a predetermined region of the third resist film and developing the third resist film, and baking the third resist pattern, wherein the first, second, and third cholesteric pitches are different from each other.

Furthermore, the color reflecting layer stack of the color filter substrate according to the present invention can have the following arrangement. That is, the planar-oriented cholesteric liquid crystal layers have the same sign of chirality. A phase difference layer is formed on the color reflecting layer stack. A white reflecting layer is formed on the side of the color reflecting layer stack away from the phase difference layer. This white reflecting layer is a cholesteric liquid crystal layer having a chirality different from that of the color reflecting layer stack. The phase difference of the phase difference layer is set to $+\pi/4$ or $-\pi/4$ in the wavelength region of colors transmitted by the color filter. As this phase difference layer, it is possible to use, e.g., a polymer stretched film or a liquid crystal polymer film. The use of a liquid crystal polymer film is particularly desirable in respect of the process because a thin phase difference layer can be formed.

This color filter substrate can be manufactured by a method comprising the steps of forming a first resist film by coating a substrate with a first cholesteric liquid crystal resist having a first cholesteric pitch, forming a first resist pattern having the first cholesteric pitch by irradiating ultraviolet radiation on a predetermined region of the first resist film and developing the first resist film, and baking the first resist pattern, forming a second resist film by coating the substrate, on which the first resist pattern is formed, with a second cholesteric liquid crystal resist having a second cholesteric pitch and the same chirality as the first cholesteric liquid crystal resist, forming a second resist pattern having the second cholesteric pitch by irradiating ultraviolet radiation on a predetermined region of the second resist film and developing the second resist film, and baking the second resist pattern, forming a third resist film by coating the substrate, on which the second resist pattern is formed, with a third cholesteric liquid crystal resist having a third cholesteric pitch and the same chirality as the second cholesteric liquid crystal resist, forming a third resist pattern having the third cholesteric pitch by irradiating ultraviolet radiation on a predetermined region of the third resist film and developing the third resist film, and baking the third resist pattern, coating the substrate, on which the third resist pattern is formed, with an orientation film, and baking and rubbing the film to form an orientation film, and coating the orientation film with a liquid crystal polymer, and heating and slowly cooling the film to form a phase difference layer, wherein the first, second, and third cholesteric pitches are different from each other.

Members constructing a transmission-type liquid crystal display and a transmission-type liquid crystal display color filter according to the present invention will be described below.

First, a cholesteric liquid crystal layer which forms a color reflecting layer stack as a principal component of the liquid crystal display of the present invention will be described.

Let be $n_O$ and $n_E$ the refractive indices of the long and short axes of a cholesteric liquid crystal molecule, respectively, and p be the chiral pitch of a cholesteric liquid crystal layer. When light is perpendicularly incident on this cholesteric liquid crystal layer and observed in the perpendicular direction, a central wavelength $\lambda_0$ and a selective reflection wavelength width $\Delta\lambda$ of a wavelength selected by the cholesteric liquid crystal layer are represented by $$\lambda_0 = p \times n_{av}$$

$$\Delta\lambda = \lambda_0 \times \Delta n / n_E$$

where $n_{av} = (n_O \times n_E)/2$; average refractive index $\Delta n = n_O - n_E$; refractive index anisotropy.

The central wavelength $\lambda n$ is determined by adjusting the pitch of cholesteric liquid crystal. Also, it is desirable that the selection wavelength width $\Delta\lambda$ be about 80 nm in a G selective reflecting layer and 80 nm or more in R and B selective reflecting layers. Since $1.4 < n_O$ and $n_E < 1.7$ in most liquid crystal materials, it is desirable to use a material having a high refractive index anisotropy, $\Delta_n > 0.2$.

As a material series meeting the above design specification, it is desirable to use a cholesteric liquid crystal (chiral nematic liquid crystal) prepared by adding a chiral agent to a cyano-based nematic liquid crystal, because the chiral pitch is readily adjustable and the refractive index anisotropy is large. A material capable of pattern formation by exposure can be used by mixing this cholesteric liquid crystal and a heat-resistant resist or by introducing a functional group as a resist to the cholesteric liquid crystal and further adding a photopolymerization initiator.

Next, a liquid crystal polymer phase difference layer as another component of the liquid crystal display of the present invention will be described.

Letting $\Delta n$ and d be the refractive index anisotropy and the thickness of a liquid crystal polymer layer oriented in a fixed direction, respectively, retardation Re Of light vertically incident on this liquid crystal polymer layer is represented by the following expression.

$$R_e = \Delta n \times d$$

This liquid crystal polymer layer is formed as follows. A rubbed liquid crystal orientation film is used as an under layer and coated with a polymer liquid crystal material. After being heated to the glass transition temperature or higher of this material, it is rapidly cooled to freeze the orientation. Alternatively, a resist is added to the polymer liquid crystal material, which is then rapidly cooled and exposed to freeze the orientation. After that, the material is allowed to solidify by baking. This method is also effective to improve the heat resistance of the liquid crystal polymer layer. The thickness (d) of the liquid crystal polymer layer is so set that $R_e = \lambda/4$ in the range of wavelength ($\lambda = 400$ to 700 nm) which passes through a color filter. To correct wavelength dispersion by using the additive property of retardation, the use of two or more different types of stacked liquid crystal polymer layers is also effective. If this is the case, making the orientation directions of the individual layers perpendicular to each other is particularly effective to improve the accuracy of wavelength dispersion correction.

If the thickness of the liquid crystal polymer layer is $d > 5$ $\mu$m, orientation is difficult to control. If $d < 0.5$ $\mu$m, interference occurs in the phase difference layer to change the tone of color.

Therefore, the refractive index anisotropy and orientation order formation conditions of the liquid crystal polymer material are so set that desirable Re is realized within the range of $0.5$ $\mu$m $< d < 5$ $\mu$m. As a material series meeting the above specification, it is desirable to use liquid crystal polyester such as polyglutamate as the liquid crystal polymer and polyimide as the liquid crystal orientation film.

A liquid crystal cell display method used in the liquid crystal display of the present invention will be described below.

As the liquid crystal cell display method used in the present invention, it is possible to use any of a method not requiring polarized light as incident light, a method requiring polarized light, and a method having circularly polarized light selectivity, as long as the method is a transmission-type display method requiring a backlight. As the method not requiring polarized light, it is effective to use a method (PDLC: Polymer Dispersed Liquid Crystal) which displays by controlling light scattering in a polymer/liquid crystal droplet interface by using an electric field, a PCGH mode (Cholesteric-nematic phase change type guest-host mode) in which a dichroic dye is added to a liquid crystal material which is capable of a cholesteric-nematic phase change, or a double GH mode (Double guest-host mode) in which two homogeneously oriented GH cells are stacked such that their orientation directions are orthogonal. When the liquid crystal display of the present invention is used as a projector, the use of the PDLC is particularly effective in respect of the light resistance of dye.

Of the methods using a polarizing plate, it is effective to use, e.g., an IPS mode (In-phase switching mode), a VA mode (Vertically Aligned mode), and an AFLC mode (Antiferroelectric Liquid Crystal mode), each of which is beginning to be marketed recently, in addition to a TN mode (Twisted Nematic liquid crystal mode) and an STN mode (Super Twisted Nematic liquid crystal mode) that are presently put to use in most cases.

As the methods having circularly polarized light selectivity, it is effective to use a cholesteric selective reflecting method using the property of a cholesteric liquid crystal that this liquid crystal selectively reflects circularly polarized light corresponding to the chirality of the liquid crystal. In this cholesteric selective reflecting method, a wavelength region corresponding to the pitch and refractive index of cholesteric liquid crystal is reflected. Therefore, it is difficult to control reflection/transmission over the entire visible light region. To solve this problem, it is effective to use a white reflecting cholesteric liquid crystal layer formed by dispersing a cholesteric liquid crystal in a polymer matrix and changing the chiral pitch in the cell thickness direction by controlling the polymerization conditions of the polymer matrix.

A method of applying a voltage to a liquid crystal cell in the liquid crystal display of the present invention will be described below.

As the method of applying a voltage to a liquid crystal cell, it is possible to use either of a simple matrix method of driving by using a potential difference between opposed substrates having stripe transparent electrodes, or a method of controlling the applied voltage using switching elements arranged in a matrix manner. The method using switching elements is particularly effective because the image quality can be improved. As the switching element, the use of, e.g., TFT (Thin Film Transistor) or MIN (Metal-Insulator-Metal) is effective.

As an electrode for applying a voltage to a liquid crystal cell, a transparent electrode is used (except when the IPS mode is used). As this transparent electrode, it is desirable to use an ITO (Indium-Tin-Oxide) electrode formed by doping 5 to 10 wt % of $SnO_2$ to $In_2O_3$ because this electrode has high light transmittance and is readily processable.

In the liquid crystal display of the present invention, the electrode can be formed either above (on the liquid crystal layer side of) or below the color filter. However, when it is intended to improve the image quality, especially when TFTs are used, the electrode is desirably formed above (on the liquid crystal layer side of) the color filter in order to prevent an increase in the driving voltage resulting from a divided voltage to the color filter or prevent charge-up of the color filter.

Examples of a substrate usable in the liquid crystal display of the present invention are a glass substrate and a plastic substrate each having high transmittance in the visible light region. When TFTs are to be used, it is desirable to use a non-alkali or low-alkali glass substrate to allow the TFTs to stably operate. If some other substrate is to be used, TFTs are formed on the substrate on which a passivation layer is formed for stopping alkali.

The liquid crystal display of the present invention and a method of manufacturing the color filter substrate used in the display will be described below with reference to the accompanying drawings.

First Embodiment

Figure 3:
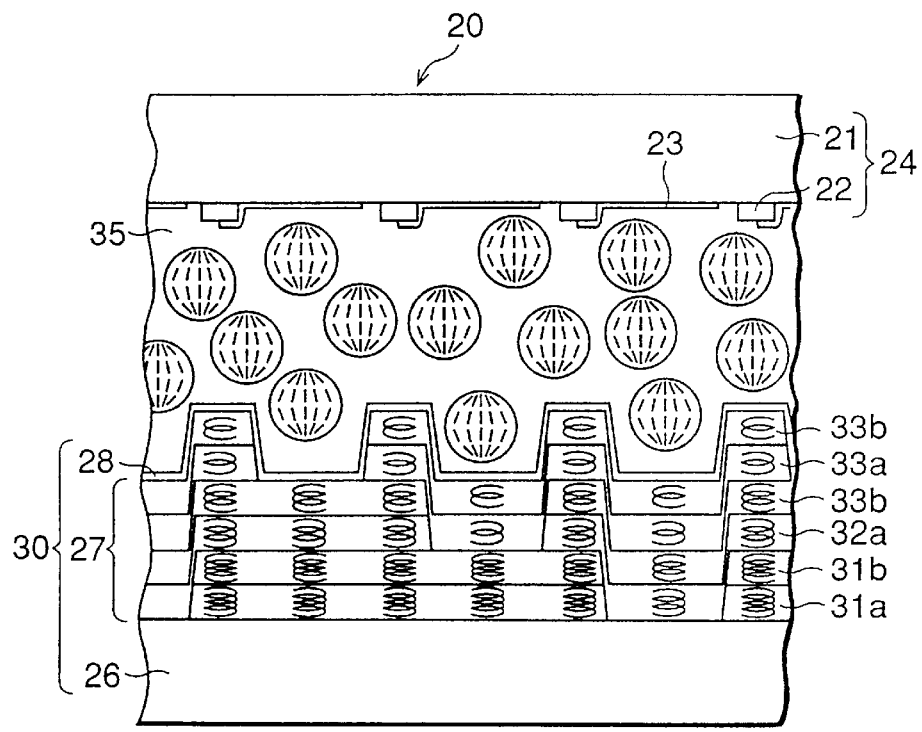
FIG. 3 is a schematic sectional view showing an example of the arrangement of a liquid crystal cell in a liquid crystal display of the first embodiment.

FIG. 3 is a schematic sectional view showing a liquid crystal cell according to this embodiment.

A liquid crystal cell 20 shown in FIG. 3 includes a TFT substrate 24, a color filter substrate 30, and a liquid crystal layer 35 sandwiched between these substrates 24 and 30. The TFT substrate 24 has switching elements 22 formed on a transparent substrate 21 in a matrix manner. The color filter substrate 30 is obtained by forming a member having a color filter function on a transparent substrate 26. Of the two substrates 24 and 30, the color filter substrate 30 opposes a light source. Pixel electrodes 23 are formed on the TFT substrate 24 by using ITO as a transparent electrode. A common electrode 28 is formed on the color filter substrate 30 by using ITO as a transparent electrode. The liquid crystal layer 35 is sandwiched between these transparent electrodes. As this liquid crystal layer, a PDLC layer not requiring a polarizing plate is used.

The color filter substrate 30 used in the liquid crystal cell shown in FIG. 3 will be described below. The color filter substrate 30 has a selective reflecting layer stack 27 made from a cholesteric liquid crystal layer. This selective reflecting layer stack 27 is formed by stacking two or more pairs of cholesteric liquid crystal sublayers (e.g., 31a and 31b) having the same chiral pitch and right-handed and left-handed chirality. A G selective reflecting layer 32 and a B selective reflecting layer 31 are formed below an R color filter. An R selective reflecting layer 33 and the B selective reflecting layer 31 are formed below a G color filter. The R selective reflecting layer 33 and the G selective reflecting layer 32 are formed below a B color filter. In addition, the R, G, and B selective reflecting layers (33, 32, and 31) are stacked in portions corresponding to interconnections 22 of the TFT substrate 24. In this arrangement, an R pixel portion returns G and B light components to the light source. A G pixel portion returns B and R light components to the light source. A B pixel portion returns R and G light components to the light source. A non-pixel portion returns all of R, G and B light components to the light source. Consequently, the structure can effectively use the light components.

Figure 4A:
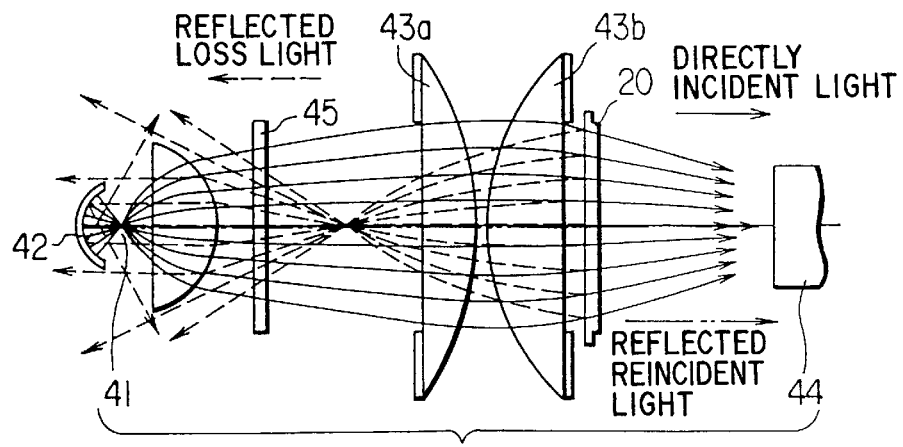
FIGS. 4A and 4B are schematic views showing an example of the arrangement of a liquid crystal projector.
Figure 4B:
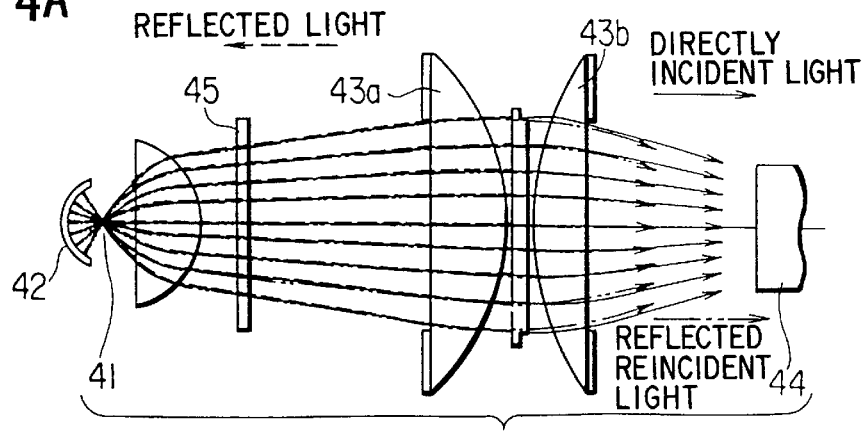
Figure 5:
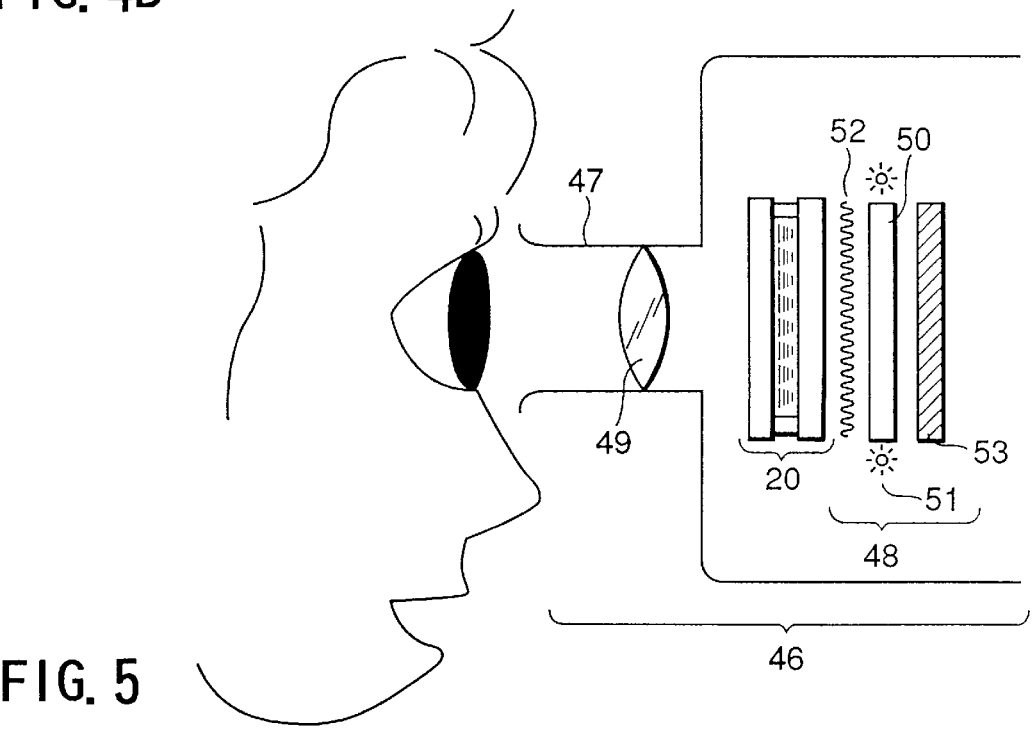
FIG. 5 is a schematic view showing an example of the arrangement of a liquid crystal viewfinder/head mounted display.

The liquid crystal cell shown in FIG. 3 can be applied to any of a liquid crystal projector, a viewfinder, and a head mounted display. FIGS. 4A and 4B show the arrangements of liquid crystal projectors. FIG. 5 shows the arrangement of a liquid crystal viewfinder/head mounted display.

Liquid crystal projectors 40 shown in FIGS. 4A and 4B include a metal halide light source 41, a reflecting mirror 42, a condenser lens 43, and a screen 44. The reflecting mirror 42 surrounds the side of the metal halide light source away from the liquid crystal cell 20. The condenser lens 43 focuses an image on the liquid crystal cell. The screen 44 shows the image of the liquid crystal cell. A UV/near-infrared cut filter 45 is also inserted between the condenser lens and the light source.

In the liquid crystal projectors 40 with the above arrangements, the liquid crystal cell 20 shown in FIG. 3 is arranged with the color filter substrate 30 facing the light source 41. Light reflected by the color reflecting layer 27 in the liquid crystal cell 20 passes through the condenser lens 43, is reflected by the reflecting mirror 42, again passes through the condenser lens 43, and returns to the color reflecting layer 27. In this manner, light goes back and forth between the color reflecting layer 27 and the reflecting mirror 42 until it reaches a transmittable color pixel. This allows effective use of light. Either of the optical systems shown in FIGS. 4A and 4B can be used. However, the optical system shown in FIG. 4B is more desirable because the efficiency of reuse of reflected light is higher.

The arrangement of a liquid crystal viewfinder/head mounted display shown in FIG. 5 will be described next.

A liquid crystal viewfinder/head mounted display 46 shown in FIG. 5 includes a light-shielding cylinder 47, a liquid crystal cell 20, and a backlight optical system 48. The light-shielding cylinder 47 has a function of preventing the reflection of external light on the cholesteric reflecting layer stack 27. A lens 49 is placed inside the cylinder 47. The backlight optical system 48 includes a light-guiding plate 50, fluorescent tubes 51 as light sources facing the end surfaces of the light-guiding plate 50, a transparent diffusing plate 52 inserted between the light-guiding plate and the liquid crystal cell 20, and a light-diffusing reflecting plate 53 placed on the other side of the light-guiding plate.

In the liquid crystal viewfinder/head mounted display with the above arrangement, the liquid crystal cell 20 shown in FIG. 3 is arranged with the color filter substrate 30 facing the backlight optical system 48. Light reflected by the color reflecting layer 27 of the liquid crystal cell 20 passes through the transparent diffusing plate 52 and the light-guiding plate 50, is reflected by the reflecting plate 53, again passes through the light-guiding plate 50 and the transparent diffusing plate 52, and returns to the color reflecting layer 27. In this manner, light goes back and forth between the color reflecting layer stack 27 and the diffusing reflecting plate 53 until it reaches a transmittable color pixel. This allows effective use of light.

A method of manufacturing the color filter substrate 30 used in the liquid crystal display shown in FIG. 3 will be described below with reference to the accompanying drawings.

Figure 6A:
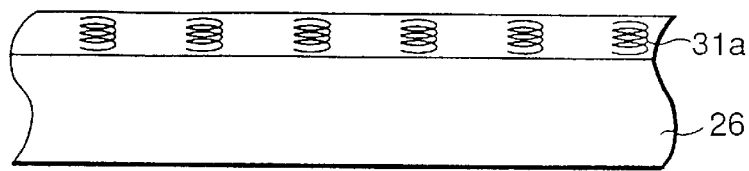
FIGS. 6A to 6C are sectional views showing an example of a process of manufacturing a color filter substrate in the liquid crystal display of the first embodiment.
Figure 6B:
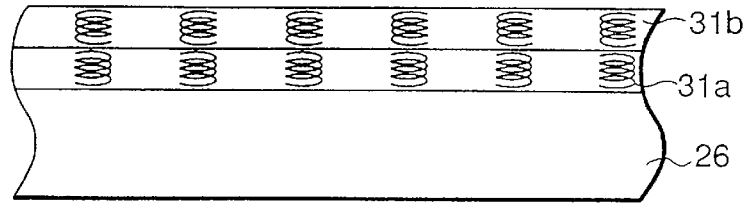

First, as shown in FIG. 6A, a substrate 26 is coated with a B+ (right-handed) reflecting layer resist by spin coating to form a 2-μm thick resist film 31a. This film 31a is coated with a B− (left-handed) reflecting layer resist by spin coating to form a resist film 31b (film thickness 2 μm) as shown in FIG. 6B.

Figure 6C:
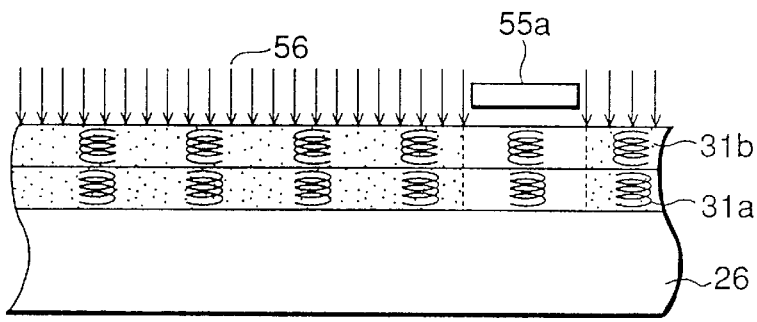
Figure 7A:
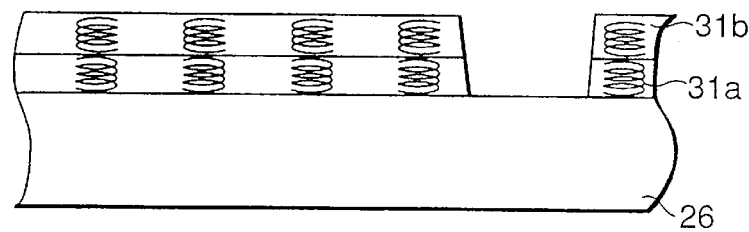
FIGS. 7A to 7C are sectional views showing the example of a process of manufacturing a color filter substrate in the liquid crystal display of the first embodiment.

Next, as shown in FIG. 6C, UV light 56 is irradiated on those portions in the resist films 31a and 31b, which correspond to R and G pixels and non-pixel portions, through a mask 55a having a predetermined pattern, thereby performing pattern exposure. The exposed resist films 31a and 31b are developed to selectively remove non-exposed portions and leave exposed portions behind, thereby obtaining patterned resist films. The patterned resist films are allowed to solidify by baking to form B reflecting layers 31a and 31b as shown in FIG. 7A.

Figure 7B:
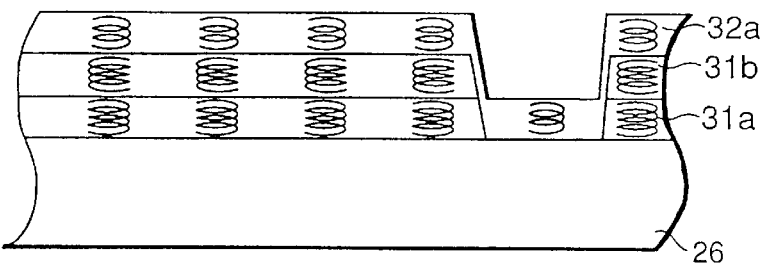
Figure 7C:
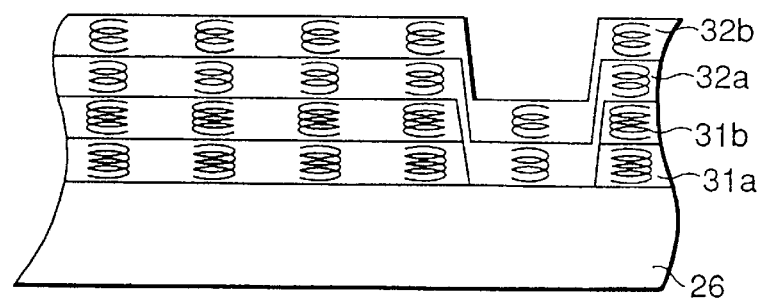

As shown in FIG. 7B, the substrate on which the B reflecting layers are formed is coated with a G+ (right-handed) reflecting layer resist by spin coating to form a 2-μm thick resist film 32a. This film 32a is coated with a G− (left-handed) reflecting layer resist by spin coating to form a resist film 32b (film thickness 2 μm) as shown in FIG. 7C.

Figure 8A:
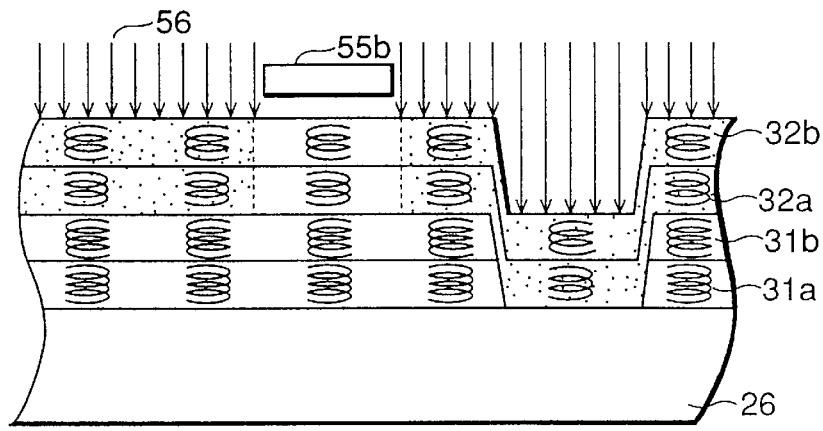
FIGS. 8A and 8B are sectional views showing the example of a process of manufacturing a color filter substrate in the liquid crystal display of the first embodiment.
Figure 8B:
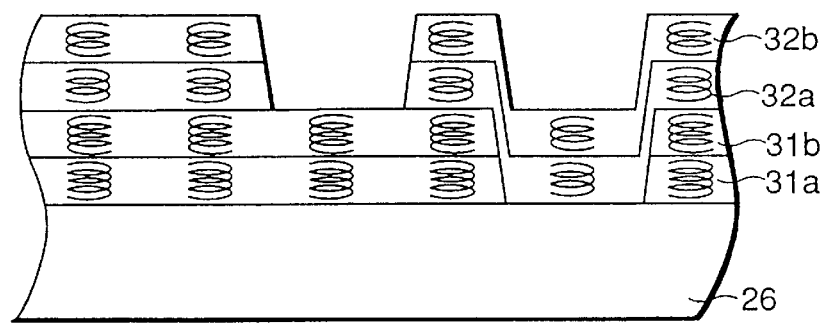

After that, as shown in FIG. 8A, UV light 56 is irradiated on those portions in the resist films 32a and 32b, which correspond to B and R pixels and non-pixel portions, through a mask 55b having a predetermined pattern, thereby performing pattern exposure. The exposed resist films 32a and 32b are developed to selectively remove non-exposed portions and leave exposed portions behind, thereby obtaining patterned resist films. The patterned resist films are allowed to solidify by baking to form G reflecting layers 32a and 32b as shown in FIG. 8B.

Figure 9A:
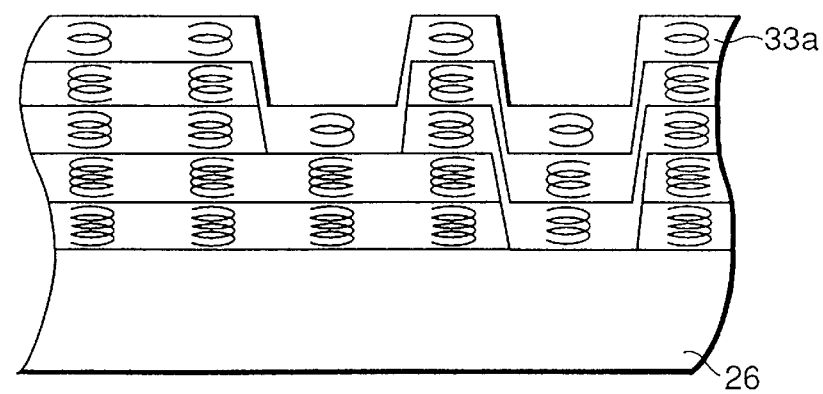
FIGS. 9A and 9B are sectional views showing the example of a process of manufacturing a color filter substrate in the liquid crystal display of the first embodiment.
Figure 9B:
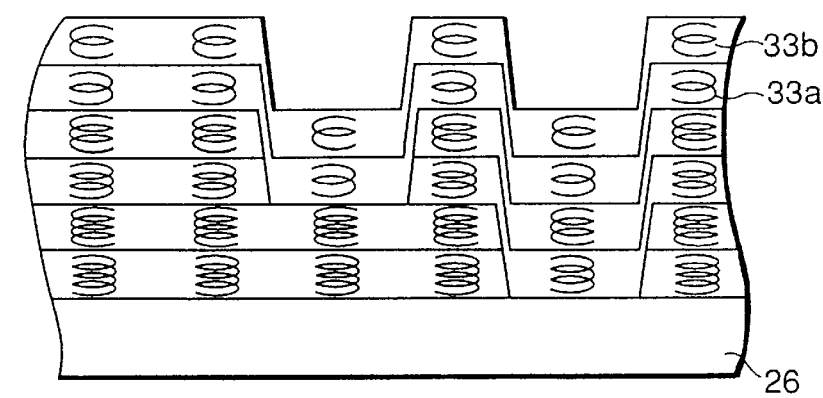

Subsequently, as shown in FIG. 9A, the substrate on which the B and G reflecting layers are formed is coated with an R+ (right-handed) reflecting layer resist by spin coating to form a 2-μm thick resist film 33a. This film 33a is coated with an R− (left-handed) reflecting layer resist by spin coating to form a resist film 33b (film thickness 2 μm) as shown in FIG. 9B.

Figure 10A:
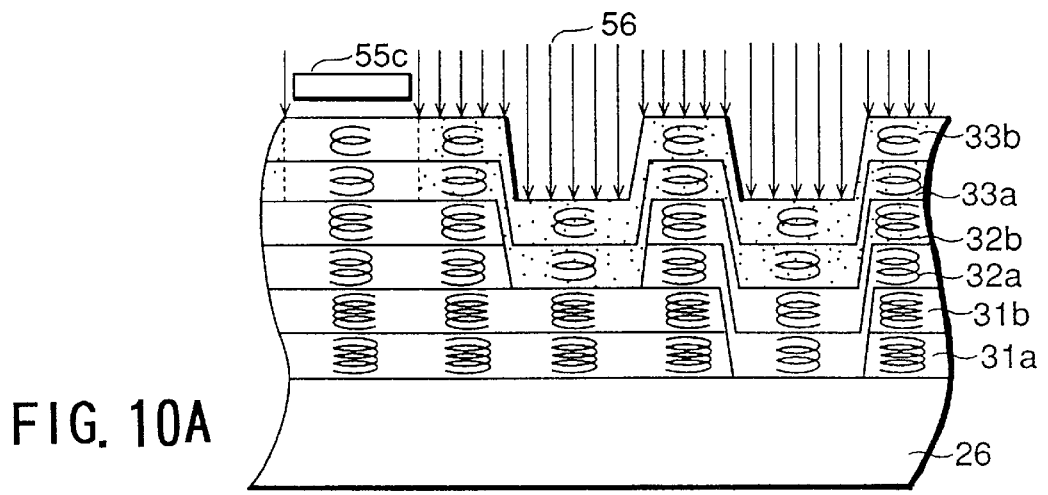
FIGS. 10A and 10B are sectional views showing the example of a process of manufacturing a color filter substrate in the liquid crystal display of the first embodiment.
Figure 10B:
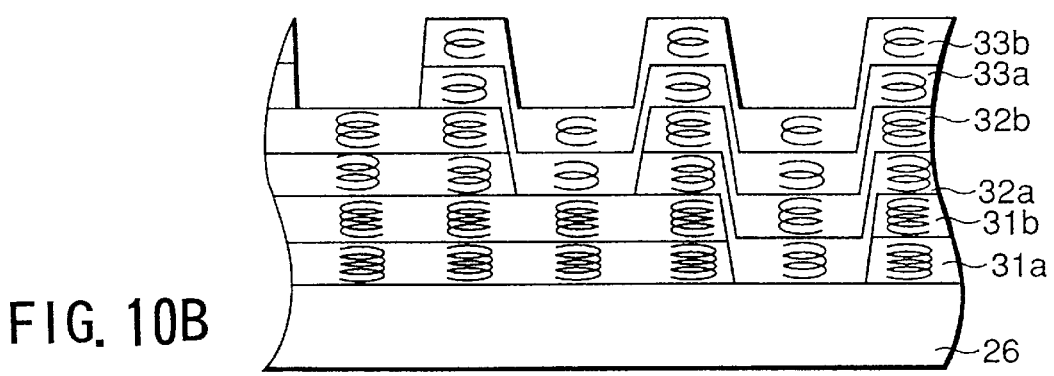

Next, as shown in FIG. 10A, UV light 56 is irradiated on those portions in the resist films 33a and 33b, which correspond to B and G pixels and non-pixel portions, through a mask 55c having a predetermined pattern, thereby performing pattern exposure. The exposed resist films 33a and 33b are developed to selectively remove non-exposed portions and leave exposed portions behind, thereby obtaining patterned resist films. The patterned resist films are allowed to solidify by baking to form R reflecting layers 33a and 33b as shown in FIG. 10B.

Finally, 150-nm thick ITO as a transparent electrode is formed on the resultant structure by sputtering. Consequently, the color filter substrate 30 as shown in FIG. 3 is obtained.

In the color filter substrate manufactured as above, the color reflecting layer stack is formed by stacking a plurality of pairs of planar-oriented cholesteric liquid crystal sublayers having the same achiral pitch and different chirality. Accordingly, all light components can be reflected regardless of the polarizing direction.

Second Embodiment

Figure 11:
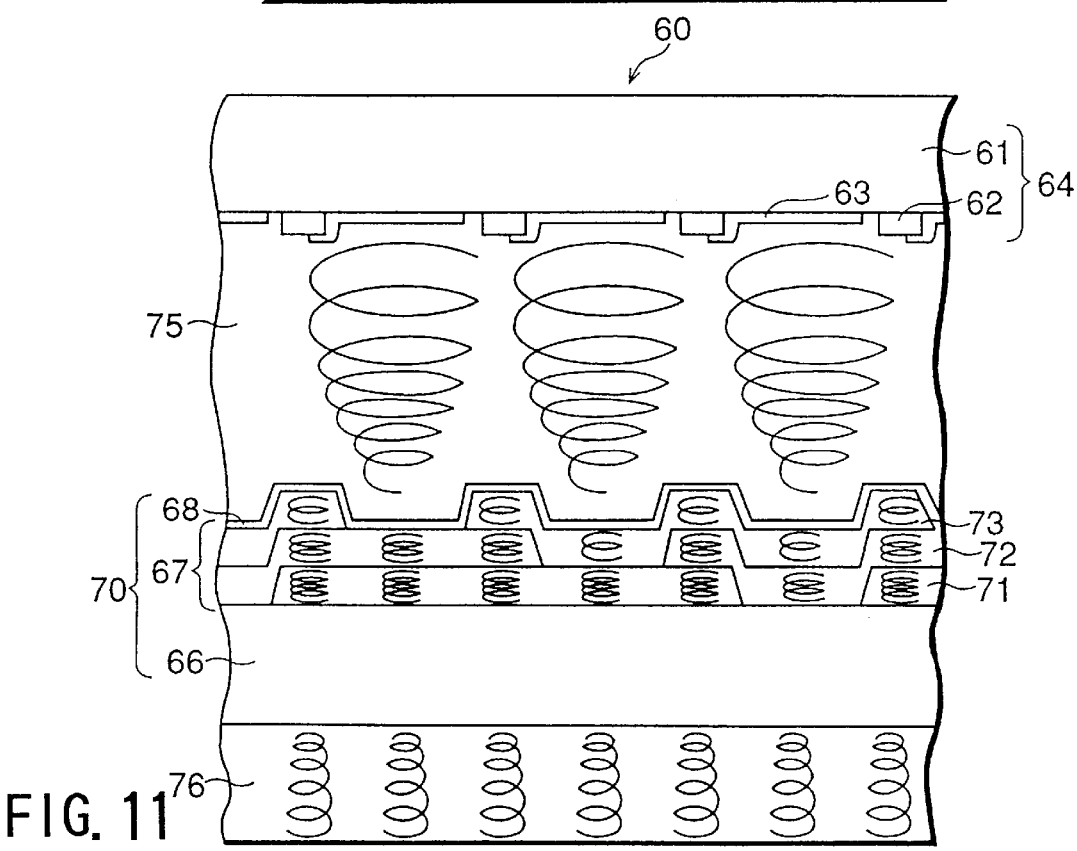
FIG. 11 is a schematic sectional view showing an example of the arrangement of a liquid crystal cell in a liquid crystal display of the second embodiment.

FIG. 11 is a schematic sectional view showing a liquid crystal cell according to this embodiment.

A liquid crystal cell 60 shown in FIG. 11 includes a TFT substrate 64, a color filter substrate 70, and a liquid crystal layer 75 sandwiched between these substrates 64 and 70. The TFT substrate 64 has switching elements 62 formed on a transparent substrate 61 in a matrix manner. The color filter substrate 70 is obtained by forming a member having a color filter function on a transparent substrate 66. Of the two substrates 64 and 70, the color filter substrate 70 opposes a light source. Pixel electrodes 63 are formed on the TFT substrate 64 by using ITO as a transparent electrode. A common electrode 68 is formed on the color filter substrate 70 by using ITO as a transparent electrode. The liquid crystal layer 75 is sandwiched between these transparent electrodes. As this liquid crystal layer, a cholesteric selective reflecting layer having selectivity to circularly polarized light is used. The structure can control the reflection/transmission of white light by using different pitches in the cell thickness direction.

The liquid crystal cell shown in FIG. 11 can be applied to either of the liquid crystal projectors as shown in FIGS. 4A and 4B and the viewfinder/head mounted display as shown in FIG. 5. The arrangements shown in FIGS. 4A, 4B, and 5 are the same as in the first embodiment, so a detailed description thereof will be omitted.

The color filter substrate 70 used in the liquid crystal cell shown in FIG. 11 will be described below. The color filter substrate 70 has a selective reflecting layer stack 67 made from a cholesteric liquid crystal layer. This selective reflecting layer stack 67 is formed by stacking layers having the same chirality and different chiral pitches. A G selective reflecting layer 72 and a B selective reflecting layer 71 are formed below an R color filter. An R selective reflecting layer 73 and the B selective reflecting layer 71 are formed below a G color filter. The R selective reflecting layer 73 and the G selective reflecting layer 72 are formed below a B color filter. In addition, the three R, G, and B selective reflecting layers (73, 72, and 71) are stacked in portions corresponding to interconnections 62 of the TFT substrate 64.

A white reflecting layer 76 made from a cholesteric liquid crystal layer is formed on the side of the color filter substrate 70 closer to the light source. The chirality of the cholesteric liquid crystal layer forming this white reflecting layer 76 is opposite to that of the selective reflecting layer stack 67 in the color filter substrate 70. Also, the chirality of the cholesteric liquid crystal layer forming the white reflecting layer 76 is opposite to that of the liquid crystal layer 75.

In this arrangement, circularly polarized light not used in display in the liquid crystal layer 75 is reflected by the white reflecting layer 76 and reflected by a reflecting plate (reflecting mirror) of a backlight optical system. Consequently, the phase changes by n and reverses the rotating direction of the circularly polarized light. This light is transmitted through the white reflecting layer 76.

Of the light transmitted through the white reflecting layer 76, an R pixel portion returns G and B light components to the light source. A G pixel portion returns B and R light components to the light source. A B pixel portion returns R and G light components to the light source. A non-pixel portion returns all of R, G and B light components to the light source. In this manner, light goes back and forth between the selective reflecting layer stack 67 and the reflecting plate (reflecting mirror) of the backlight optical system. Consequently, the structure can effectively use light.

A method of manufacturing the color filter substrate 70 used in the liquid crystal display shown in FIG. 11 will be described below with reference to the accompanying drawings.

Figure 12A:
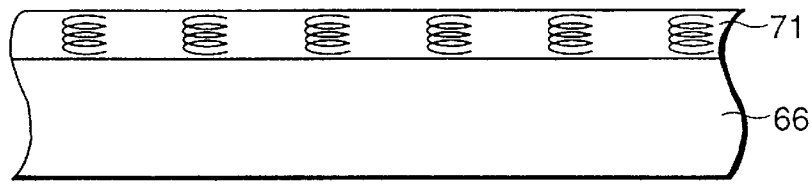
FIGS. 12A to 12C are sectional views showing an example of a process of manufacturing a color filter substrate in the liquid crystal display of the second embodiment.
Figure 12B:
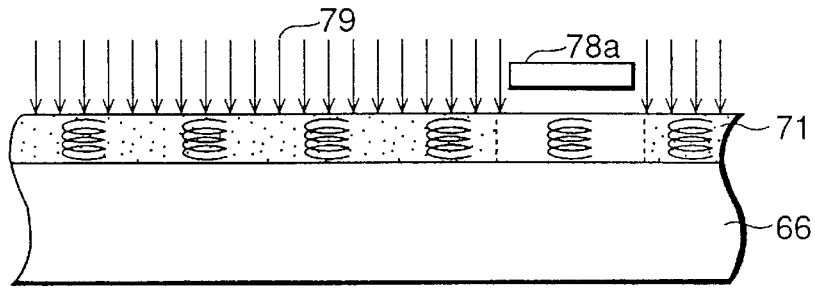
Figure 12C:
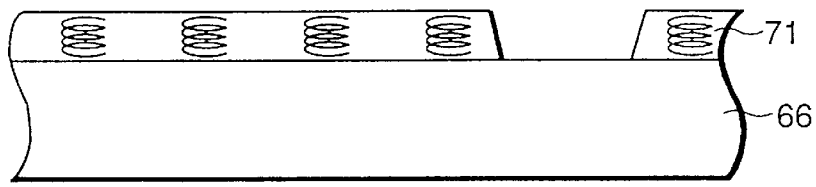

First, as shown in FIG. 12A, a substrate 66 is coated with a B⁻ (left-handed) reflecting layer resist by spin coating to form a 2-μm thick resist film 71. Next, as shown in FIG. 12B, UV light 79 is irradiated on those portions in the resist film 71, which correspond to R and G pixels and non-pixel portions, through a mask 78a having a predetermined pattern, thereby performing pattern exposure. The exposed resist film 71 is developed to selectively remove non-exposed portions and leave exposed portions behind, thereby obtaining a patterned resist film. The patterned resist film is allowed to solidify by baking to form a B reflecting layer 71 as shown in FIG. 12C.

Figure 13A:
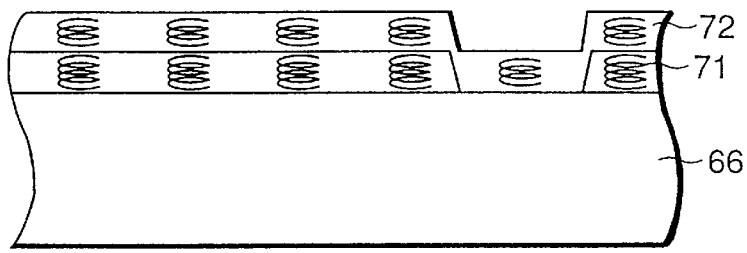
FIGS. 13A to 13C are sectional views showing the example of a process of manufacturing a color filter substrate in the liquid crystal display of the second embodiment.
Figure 13B:
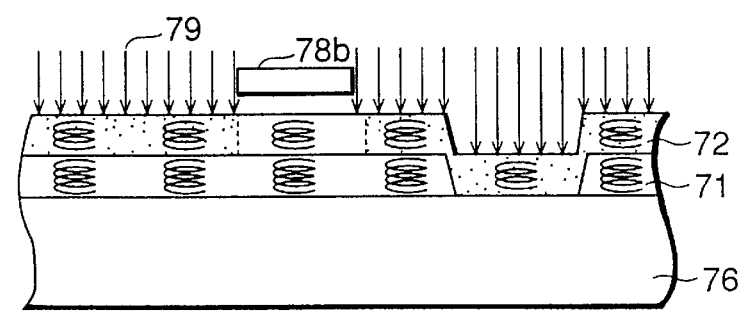
Figure 13C:
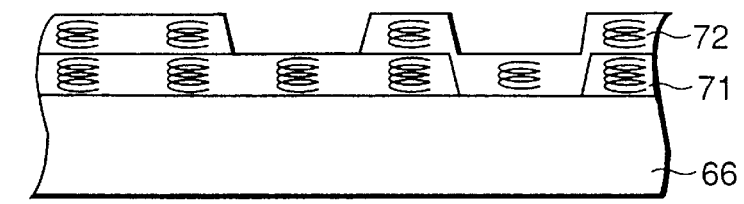

As shown in FIG. 13A, the substrate on which the B reflecting layer is formed is coated with a G⁻ (left-handed) reflecting layer resist by spin coating to form a 2-μm thick resist film 72. Then, as shown in FIG. 13B, UV light 79 is irradiated on those portions in the resist film 72, which correspond to B and R pixels and non-pixel portions, through a mask 78b having a predetermined pattern, thereby performing pattern exposure. The exposed resist film 72 is developed to selectively remove non-exposed portions and leave exposed portions behind, thereby obtaining a patterned resist film. The patterned resist film is allowed to solidify by baking to form a G reflecting layer 72 as shown in FIG. 13C.

Figure 14A:
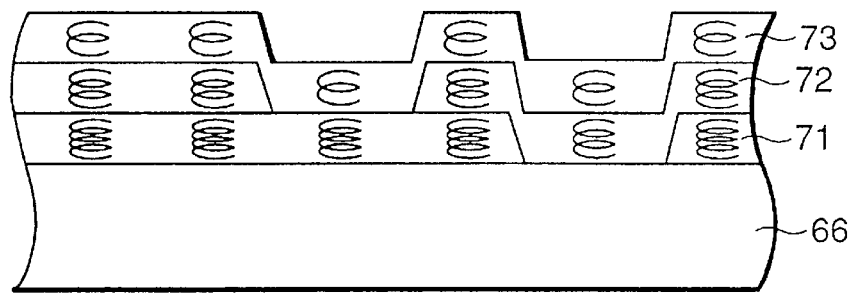
FIGS. 14A to 14C are sectional views showing the example of a process of manufacturing a color filter substrate in the liquid crystal display of the second embodiment.
Figure 14B:
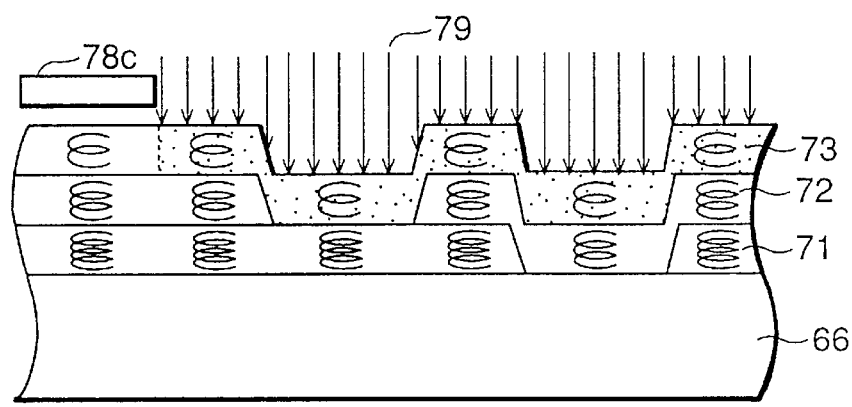
Figure 14C:
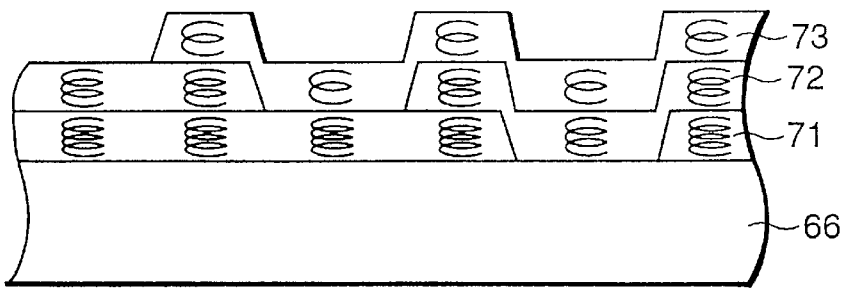

Subsequently, as shown in FIG. 14A, the substrate on which the B and G reflecting layers are formed is coated with an R⁻ (left-handed) reflecting layer resist by spin coating to form a 2-μm thick resist film 73. Next, as shown in FIG. 14B, UV light 79 is irradiated on those portions in the resist film 73, which correspond to G and B pixels and non-pixel portions, through a mask 78c having a predetermined pattern, thereby performing pattern exposure. The exposed resist film 73 is developed to selectively remove non-exposed portions and leave exposed portions behind, thereby obtaining a patterned resist film. The patterned resist film is allowed to solidify by baking to form an R reflecting layer 73 as shown in FIG. 14C.

Figure 15:
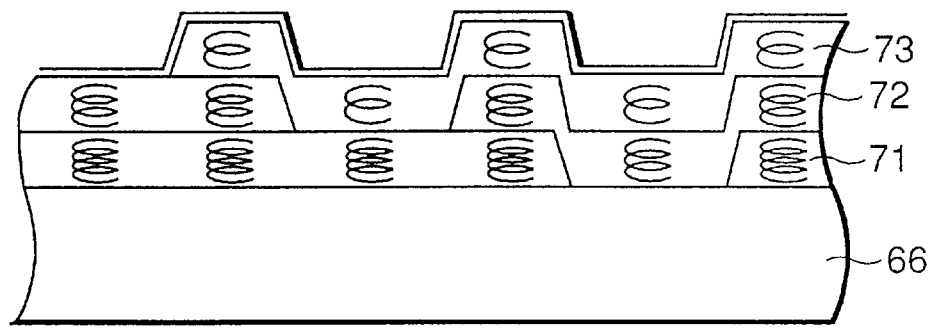
FIG. 15 is a sectional views showing the example of a process of manufacturing a color filter substrate in the liquid crystal display of the second embodiment.

The B, G, and R reflecting layers 71, 72, and 73 thus formed are coated with a liquid crystal orientation film, which is then baked and rubbed. The result is a structure as shown in FIG. 15.

Finally, 150-nm thick ITO as a transparent electrode is formed on the resultant structure by sputtering to complete the color filter substrate used in this embodiment.

The color filter substrate manufactured as above is combined with the liquid crystal mode having selectivity to circularly polarized light. Accordingly, a polarizing plate and a phase difference plate can be omitted.

Third Embodiment

Figure 16:
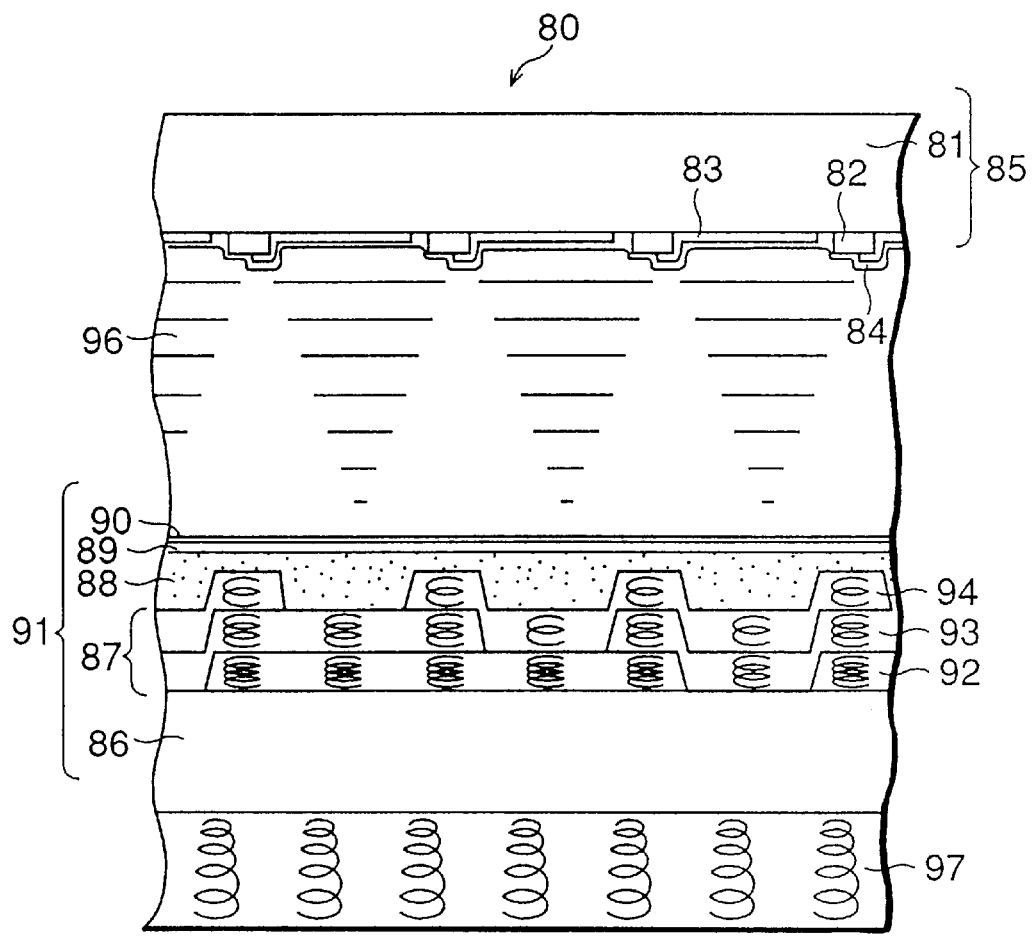
FIG. 16 is a schematic sectional view showing an example of the arrangement of a liquid crystal cell in a liquid crystal display of the third embodiment.

FIG. 16 is a schematic sectional view showing a liquid crystal cell according to this embodiment.

A liquid crystal cell 80 shown in FIG. 16 includes a TFT substrate 85, a color filter substrate 91, and a liquid crystal layer 96 sandwiched between these substrates 85 and 91. The TFT substrate 85 has switching elements 82 formed on a transparent substrate 81 in a matrix manner. The color filter substrate 91 is obtained by forming a member having a color filter function on a transparent substrate 86. Of the two substrates 85 and 91, the color filter substrate 91 opposes a light source. Pixel electrodes 83 are formed on the TFT substrate 81 by using ITO as a transparent electrode. A common electrode 89 is formed on the color filter substrate 91 by using ITO as a transparent electrode. As the liquid crystal layer, a TN liquid crystal layer is used.

The liquid crystal cell shown in FIG. 16 can be applied to either of the liquid crystal projectors as shown in FIGS. 4A and 4B and the viewfinder/head mounted display as shown in FIG. 5. The arrangements shown in FIGS. 4A, 4B, and 5 are the same as in the first embodiment, so a detailed description thereof will be omitted.

The color filter substrate 91 used in the liquid crystal cell shown in FIG. 16 will be described below. The color filter substrate 91 is the same as that of the second embodiment described above except that a λ/4 phase difference layer 88 is formed between a selective reflecting layer stack 87 made from a cholesteric liquid crystal layer and the common electrode 89.

As explained in the second embodiment, an RGB color pattern (color reflecting layer stack 87) having selectivity to specific circularly polarized light is formed below (on the light source side of) the λ/4 phase difference layer 88. Since the λ/4 phase difference layer 88 is stacked on this color pattern (on the liquid crystal layer side), circularly polarized light is converted into linearly polarized light. With this arrangement, the color filter can also have a function of a polarizing plate. An orientation film formed below the λ/4 phase difference layer 88 has a function of aligning liquid crystal polymer layers in a specific direction.

A method of manufacturing the color filter substrate 91 used in the liquid crystal display shown in FIG. 16 will be described below with reference to the accompanying drawings.

This color filter substrate 91 can be formed following the same procedure as in the second embodiment until the formation of the cholesteric selective reflecting layer stack 87. Therefore, a description of the procedure up to this point will be omitted, and a subsequent process of forming the phase difference layer 88 made from a liquid crystal polymer will be described below.

Figure 17:
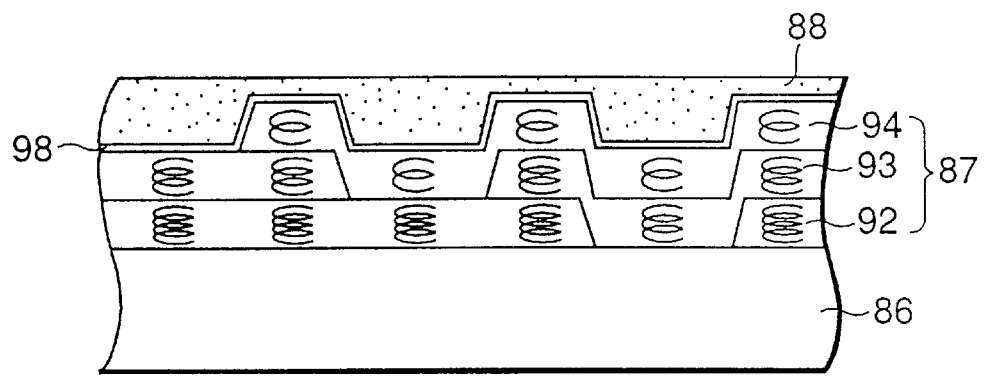
FIG. 17 is a sectional views showing an example of a process of manufacturing a color filter substrate in the liquid crystal display of the third embodiment.

First, a substrate for forming the phase difference layer is coated with a 0.1-μm thick polyimide film as a liquid crystal orientation film, which is then baked and rubbed. A liquid crystal polymer is formed to have a desired thickness by spin coating. The temperature is increased to the glass transition point of the liquid crystal polymer to form a monodomain structure and rapidly decreased to freeze the orientation. The result is a structure in which a liquid crystal orientation film 98 and the λ/4 phase difference layer 88 are formed on the selective reflecting layer stack 87 as shown in FIG. 17.

Finally, 150-nm thick ITO as a transparent electrode is formed on the resultant structure by sputtering to complete the color filter substrate 91 as shown in FIG. 16.

The color filter substrate thus manufactured can be given a function of a polarizing plate because the substrate is combined with the λ/4 phase difference layer.

(Performance Comparison)

Table 1 below shows performance comparison between a conventional three-panel liquid crystal projector, a single-panel liquid crystal projector using an absorption color filter formed by a pigment dispersion method, and single-panel liquid crystal projectors using the liquid crystal cells of the first to third embodiments. The PDLC scheme was used as a liquid crystal display method in the three-panel projector and the absorption CF single-panel projector. The consumption power and the manufacturing cost are represented by relative values with respect to a reference value (100) of the three-panel projector.

TABLE 1

| Display method | Consumption power | CF reliability | Size | Manufacturing cost |
|---|---|---|---|---|
| Three-panel | 100 | ○ | X | 100 |
| Absorption CF single-panel | 420 | X | ○ | 20 |
| First embodiment | 80 | ○ | ○ | 20 |
| Second embodiment | 70 | ○ | ○ | 21 |
| Third embodiment | 90 | ○ | ○ | 22 |

As shown in Table 1, the manufacturing cost of the absorption CF single-panel projector is apparently low. However, this projector cannot be practically used because the reliability of the CF is significantly low. In addition, the consumption power of the absorption CF single-panel projector is 420, a very large value.

In contrast, the manufacturing cost of each liquid crystal projector of the present invention is reduced to about 20, and even the maximum consumption power is 90. The reliability of the CF was not at all lowered, and miniaturization was also possible. The consumption power of each liquid crystal projector of the present invention is lower than that of the conventional three-panel projector because the light utilization in a light-shielding portion was improved.

Table 2 below shows values of the consumption power and the manufacturing cost of a liquid crystal viewfinder using a conventional absorption color filter formed by pigment dispersion and liquid crystal viewfinders using the liquid crystal cells of the first to third embodiments. The TN scheme was used as a liquid crystal display method in the conventional liquid crystal viewfinder. A value obtained without using a white reflecting plate for polarization conversion is a reference value (100).

TABLE 2

| Display method | Consumption power | Manufacturing cost |
|---|---|---|
| Conventional TN method | 100 | 100 |
| Conventional TN method + polarization converting white reflecting plate | 60 | 108 |
| First embodiment | 15 | 100 |
| Second embodiment | 13 | 108 |
| Third embodiment | 17 | 110 |

As shown in Table 2, the present invention realizes a large reduction in the consumption power without increasing the manufacturing cost. Note that the manufacturing cost is 110 when the liquid crystal cell of the third embodiment is used. However, this increase (10) is smaller than a cost reduction (−20 to −30) accomplished by a reduction of the consumption power. Therefore, an increase in the manufacturing cost to such an extent is not a problem.

Comparative Example

Figure 18:
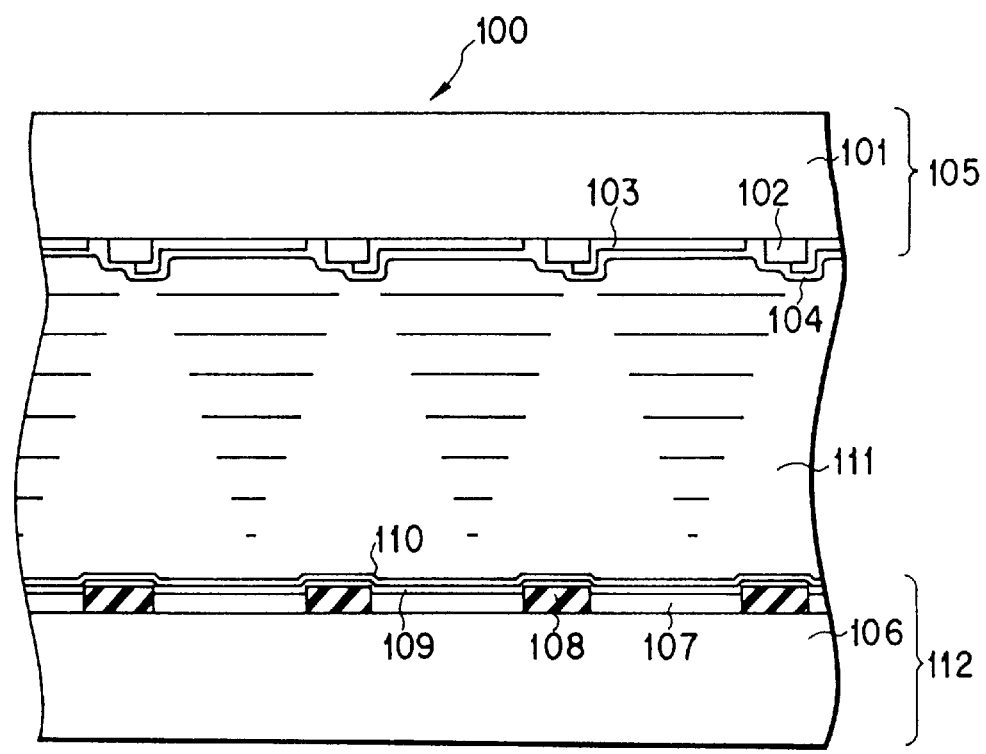
FIG. 18 is a schematic sectional view showing the arrangement of a liquid cell in a liquid crystal display as a comparative example.

As a comparative example, a liquid crystal display as shown in FIG. 18 was manufactured. A liquid crystal cell 100 shown in FIG. 18 includes a TFT substrate 105, a color filter substrate 112, and a liquid crystal layer 111 sandwiched between these substrates 105 and 112. The TFT substrate 105 has switching elements 102 formed on a transparent substrate 101 in a matrix manner. The color filter substrate 112 is obtained by forming a pigment dispersion color filter 107 and a black matrix 108 made of a black dispersion layer on a transparent substrate 106. Of the two substrates 105 and 112, the color filter substrate 112 opposes a light source. Pixel electrodes 103 are formed on the TFT substrate 105 by using ITO as a transparent electrode. A common electrode 109 is formed on the color filter substrate 112 by using ITO as a transparent electrode. The liquid crystal layer 111 is sandwiched between these transparent electrodes.

As the liquid crystal layer, a TN liquid crystal layer is used. This liquid crystal layer is so controlled that a 90° twist is formed by orientation films 104 and 110 formed on the substrates 105 and 112, respectively. The size of the color filter layer 107 on the substrate 112 is made smaller than that of the opposing pixel electrode 103. The black matrix layer 108 is so formed as to shield the peripheral portion of this color filter layer 107.

In this arrangement, therefore, light incident from the color filter substrate 112 is transmitted through the color filter layer 107 and enters the pixel electrode 103 through the liquid crystal layer. Accordingly, the light utilization of the display shown in FIG. 18 is equivalent to the aperture ratio except for the black matrix layer 108 formed on the color filter substrate.

As described above, the performance of the liquid crystal display of this comparative example is the transmittance determined by the aperture ratio of the color filter black matrix. For this reason, incoming light on the black matrix makes no contribution to display. Also, in the manufacture of this liquid crystal display, the yield of pattern formation is low due to the dispersion or absorption of a pigment. This lowers the productivity of the liquid crystal display.

This comparative example shows that when a BM (black matrix) was additionally formed on a color filter substrate, this BM produced a loss of incident light and lowered the light utilization by at least 20 to 30%. Consequently, the liquid crystal display of the comparative example was found to be inferior to the liquid crystal display of the present invention.

In the present invention as has been described above, when color display is performed by spatial color division, colors not used in the display and light incident on the non-aperture portion are returned to a backlight and effectively used. Consequently, a loss of light caused by a color filter can be greatly reduced. This is particularly effective in products, such as a liquid crystal projector and a viewfinder portable information apparatus, in which the aperture ratio is necessarily low (by a large area of interconnections and the like) because high resolution is required. This makes it possible to greatly reduce the consumption power of a liquid crystal display. Especially when the present invention is applied to a liquid crystal projector, it is possible to realize a single-panel projector which cannot be accomplished because of deterioration caused by light absorption by a color filter. Consequently, the manufacturing cost can be largely reduced.

This liquid crystal display is best suited to a liquid crystal projector, a liquid crystal viewfinder, a head mounted display, and a portable terminal, and has an immeasurable industrial value.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A liquid crystal display comprising:
a first substrate having a transparent electrode formed on a surface and a non-aperture portion in a predetermined region;
a second substrate arranged to be separated from and opposed to said first substrate, a member having a color filter function and a transparent electrode being formed on said second substrate;
a liquid crystal layer sandwiched between said first and second substrates; and
a backlight optical system arranged on a side of said second substrate away from said first substrate,
wherein said member formed on said second substrate and having a color filter function is patterned in accordance with a display unit controlled by said two transparent electrodes and is a color reflecting layer stack constituted by a stack of a first planar-oriented cholesteric liquid crystal layer having a first chiral pitch and a second planar-oriented cholesteric liquid crystal layer having a second chiral pitch different from the first chiral pitch, and
said color reflecting layer stack has a three-layered stacked region formed by further stacking a third planar-oriented cholesteric liquid crystal layer having a third chiral pitch different from the first and second chiral pitches, said three-layered stacked region corresponding to said non-aperture portion of said first substrate and having a function of returning light from said non-aperture portion to said backlight optical system.

2. A display according to claim 1, wherein said backlight optical system comprises a reflecting member and a light source interposed between said reflecting member and said second substrate.

3. A display according to claim 2, wherein said reflecting member of said backlight optical system is a reflecting mirror so formed as to surround said light source, and a lens is inserted between said light source and said second substrate.

4. A display according to claim 1, wherein each of said cholesteric liquid crystal layers constituting said color reflecting layer stack comprises a first planar-oriented cholesteric liquid crystal sublayer having a first chirality and a second planar-oriented cholesteric liquid crystal sublayer having a second chirality opposite to the first chirality.

5. A display according to claim 4, wherein said backlight optical system comprises a reflecting member and a light source interposed between said reflecting member and said second substrate.

6. A display according to claim 5, wherein said reflecting member of said backlight optical system is a reflecting mirror so formed as to surround said light source, and a lens is inserted between said light source and said second substrate.

7. A display according to claim 1, wherein said backlight optical system has a light-guiding plate, said light source opposes an end face of said light-guiding plate, and a transparent diffusing plate is inserted between said light source and said second substrate.

8. A display according to claim 1, wherein a phase difference layer is formed on a side of said first substrate of said color reflecting layer stack, and a phase difference of said phase difference layer is set to $+\pi/4$ or $-\pi/4$ in a wavelength region of a color which is transmitted through said color filter.

9. A color filter substrate comprising a substrate and a patterned member formed on said substrate and having a color filter function,
wherein said member having a color filter function is a color reflecting layer stack constituted by a stack of a first planar-oriented cholesteric liquid crystal layer having a first chiral pitch and a second planar-oriented cholesteric liquid crystal layer having a second chiral pitch different from the first chiral pitch, and
said color reflecting layer stack has a three-layered stacked region formed by further stacking a third planar-oriented cholesteric liquid crystal layer having a third chiral pitch different from the first and second chiral pitches.

10. A substrate according to claim 9, wherein each of said cholesteric liquid crystal layers constituting said color reflecting layer stack comprises a first planar-oriented cholesteric liquid crystal sublayer having a first chirality and a second planar-oriented cholesteric liquid crystal sublayer having a second chirality opposite to the first chirality.

11. A method of manufacturing a color filter substrate comprising the steps of:
forming a first resist film by coating a substrate with a first cholesteric liquid crystal resist having a first cholesteric pitch;
forming a second resist film by coating said first resist film with a second cholesteric liquid crystal resist having the first cholesteric pitch and a chirality opposite to a chirality of said first cholesteric resist;
forming a first resist pattern having the first cholesteric pitch by irradiating ultraviolet radiation on a predetermined region of said first and second resist films and developing said first and second resist films, and baking said first resist pattern;
forming a third resist film by coating said substrate, on which said first resist pattern is formed, with a third cholesteric liquid crystal resist having a second cholesteric pitch;
forming a fourth resist film by coating said third resist film with a fourth cholesteric liquid crystal resist having the second cholesteric pitch and a chirality opposite to a chirality of said third cholesteric resist;
forming a second resist pattern having the second cholesteric pitch by irradiating ultraviolet radiation on a predetermined region of said third and fourth resist films and developing said third and fourth resist films, and baking said second resist pattern;
forming a fifth resist film by coating said substrate, on which said second resist pattern is formed, with a fifth cholesteric liquid crystal resist having a third cholesteric pitch;
forming a sixth resist film by coating said fifth resist film with a sixth cholesteric liquid crystal resist having the third cholesteric pitch and a chirality opposite to a chirality of said fifth cholesteric resist; and
forming a third resist pattern having the third cholesteric pitch by irradiating ultraviolet radiation on a predetermined region of said fifth and sixth resist films and developing said fifth and sixth resist films, and baking said third resist pattern,
wherein the first, second, and third cholesteric pitches are different from each other.

12. A method of manufacturing a color filter substrate comprising the steps of:
forming a first resist film by coating a substrate with a first cholesteric liquid crystal resist having a first cholesteric pitch;

forming a first resist pattern having the first cholesteric pitch by irradiating ultraviolet radiation on a predetermined region of said first resist film and developing said first resist film, and baking said first resist pattern;

forming a second resist film by coating said substrate, on which said first resist pattern is formed, with a second cholesteric liquid crystal resist having a second cholesteric pitch;

forming a second resist pattern having the second cholesteric pitch by irradiating ultraviolet radiation on a predetermined region of said second resist film and developing said second resist film, and baking said second resist pattern;

forming a third resist film by coating said substrate, on which said second resist pattern is formed, with a third cholesteric liquid crystal resist having a third cholesteric pitch; and forming a third resist pattern having the third cholesteric pitch by irradiating ultraviolet radiation on a predetermined region of said third resist film and developing said third resist film, and baking said third resist pattern, wherein the first, second, and third cholesteric pitches are different from each other.

* * * * *